UNITED STATES PATENT OFFICE.

ADOLF J. GRINBERG, OF NEW YORK, N. Y., AND BERNARD FIELD, OF PLYMOUTH, MASSACHUSETTS; SAID ADOLF J. GRINBERG NOW BY JUDICIAL CHANGE OF NAME, ADOLF JUSTUS GRINNELL.

PROCESS OF TREATING ORGANIC MATTER FOR FERTILIZER PURPOSES.

1,268,563.

Specification of Letters Patent. Patented June 4, 1918.

No Drawing. Application filed April 27, 1917. Serial No. 164,953.

*To all whom it may concern:*

Be it known that we, ADOLF J. GRINBERG and BERNARD FIELD, both citizens of the United States, and residents, respectively, of the city, county, and State of New York and the city and county of Plymouth, Massachusetts, have invented a new and useful Process of Treating Organic Matter for Fertilizer Purposes, whereby its value as a fertilizer is greatly enhanced, because it is more quickly available, and therefore serves its purpose when applied to trees or other vegetation in a markedly-increased degree.

It is a fact that the constituents of a soil should be available for vegetation growth at the time when such growth would naturally be most active; and that unless they are thus available, the valuable substances of which such constituents are composed or into which they may be transformed, fail to render the full benefit of which they are capable. This is true not only of the natural constituents of the soil, but of added constituents as well.

If treated by our process, organic matter, which otherwise would not yield its constituents to vegetation at all, or if at all, would yield them so slowly as to be not available in quantity to the vegetation at the time when they would be of the greatest value,—namely, when the tendency to grow is greatest—is modified so that it may be applied, and will readily yield its constituents to the vegetation at the said time when they can best be utilized to obtain the greatest effect.

In addition, different soils vary in their ability to transform organic matter so as to render it available for vegetation growth. Organic matter treated by our process is made available for plant growth without being entirely dependent upon the soil in which it is applied to the vegetation.

In our process we use a sponge or leavening mass, which may be prepared in a number of ways, a preferred form of which is as follows:—

To one-half barrel of bran and sawdust in equal amounts by volume, we add three times by volume of water, one pound of corn starch and six ounces of carbonate of ammonium. This is thoroughly stirred and at the same time an infusion of acid producing bacteria, such as *Bacillus coli*, *Bacillus vulgatus* or the like is added.

This mixture we allow to stand from twenty-four to forty-eight hours when an active growth of the bacteria will be present. At this stage the sponge may be added to and thoroughly mixed with a ton of the organic matter to be treated. Humus may be used for this purpose and if its already strongly acid, a quantity of powdered limestone is added prior to mixing with the sponge. Then we add one hundred pounds of powdered phosphate slag and one hundred pounds of powdered potash feldspar.

This mixture is allowed to work for several days, after which it may be applied at once to the vegetation to be treated; or if it is intended for future use it may be dried either by exposure to the air or in a suitable drying apparatus at a low temperature.

If the mixture is so dried, water may be added immediately before or shortly after it is subsequently applied to the vegetation to be treated.

We claim:

1. The process of treating organic matter which consists in adding to the organic matter, acid producing and denitrifying bacteria, and allowing the whole to work by the growth of bacteria.

2. The process of treating organic matter which consists in adding to the organic matter, a leavening mass of acid producing and denitrifying bacteria, and allowing the whole to work by the growth of bacteria.

3. The process of treating organic matter which consists in adding to the organic matter, a substance to neutralize the acidity of said organic matter, adding acid producing and denitrifying bacteria, and allowing the whole to work by the growth of bacteria.

4. The process of treating organic matter which consists in adding a substance to neutralize the acidity of said organic matter, adding thereto acid producing and denitrifying bacteria, then adding a phosphate compound and allowing the whole to work by the growth of bacteria.

5. The process of treating organic matter which consists in adding a substance to neutralize the acidity of said organic matter, adding thereto acid producing and denitrifying bacteria, then adding a potash compound, and allowing the whole to work by the growth of bacteria.

6. The process of treating organic matter which consists in adding thereto acid producing and denitrifying bacteria, allowing the whole to work by the growth of bacteria and thereafter drying the resultant mass.

7. A new product consisting of organic matter, to which has been added acid producing and dentrifying bacteria, a phosphate compound, and a potash compound, the whole having been allowed to work by the growth of bacteria.

8. A new product consisting of organic matter, to which has been added acid producing and denitrifying bacteria, a phosphate compound and a potash compound, the whole having been allowed to work by the growth of bacteria and the resultant mass having been dried.

ADOLF J. GRINBERG,
BERNARD FIELD.

Witnesses:
MORTON COLLINGWOOD,
ETHEL W. HARRISON.